United States Patent [19]

Devine, Jr.

[11] E Re. 31,369

[45] Reissued Sep. 6, 1983

[54] METHOD FOR JOINING AN ANODE TARGET COMPRISING TUNGSTEN TO A GRAPHITE SUBSTRATE

[75] Inventor: Thomas M. Devine, Jr., Scotia, N.Y.

[73] Assignee: General Electric Company, Schenectady, N.Y.

[21] Appl. No.: 365,080

[22] Filed: Apr. 5, 1982

Related U.S. Patent Documents

Reissue of:

[64] Patent No.: 4,073,426
Issued: Feb. 14, 1978
Appl. No.: 788,244
Filed: Apr. 18, 1977

[51] Int. Cl.[3] ..... B23K 1/04

[52] U.S. Cl. ..... 228/122; 228/220

[58] Field of Search ..... 228/121, 122, 124, 220, 228/219, 232, 246, 179, 252

[56] References Cited

U.S. PATENT DOCUMENTS

| | | | |
|---|---|---|---|
| 2,163,408 | 6/1939 | Pulfrich | 228/122 X |
| 3,122,424 | 2/1964 | King . | |
| 3,442,006 | 5/1969 | Guichet et al. . | |
| 3,609,856 | 10/1951 | Eckert | 228/121 |
| 3,710,170 | 1/1973 | Friedel | 313/330 |
| 3,717,926 | 2/1973 | Anikin et al. | 228/121 |
| 3,719,854 | 3/1973 | Sedlatschek et al. | 313/330 |
| 3,890,521 | 6/1975 | Shroff | 313/330 X |
| 3,903,585 | 9/1975 | Kosteruk et al. | 228/122 X |
| 3,981,427 | 9/1976 | Brooks | 228/122 |
| 3,989,349 | 6/1975 | Kaufman | 228/220 |

FOREIGN PATENT DOCUMENTS 7112589 8/1972 Fed. Rep. of Germany .

*Primary Examiner*—Kenneth J. Ramsey
*Attorney, Agent, or Firm*—Leo I. MaLossi; James C. Davis, Jr.; James Magee, Jr.

[57] ABSTRACT

Tungsten anode targets are joined to graphite substrates by a brazing method employing a [controlled] *hydrogen* atmosphere and a suitable braze material such as platinum and an alloy of platinum and chromium.

14 Claims, 2 Drawing Figures

METHOD FOR JOINING AN ANODE TARGET COMPRISING TUNGSTEN TO A GRAPHITE SUBSTRATE

Matter enclosed in heavy brackets [ ] appears in the original patent but forms no part of this reissue specification; matter printed in italics indicates the additions made by reissue.

*This invention is related to U.S. Pat. No. 4,119,879 - Devine, Jr. upon which copending reissue application Ser. No. 365,078, filed April 5, 1982 is based and U.S. Pat. No. 4,145,632 - Devine, Jr. upon which copending reissue application Ser. No. 365,079, filed April 5, 1982 is based.*

BACKGROUND OF THE INVENTION

1. Field of the Invention

This invention relates to the methods of joining an anode target to a graphite substrate to make a disc assembly for a rotating x-ray anode tube.

2. Description of the Prior Art

The longevity and efficiency of rotating x-ray anode tubes can be increased by using anode discs capable of high heat storing and high heat dissipating properties. Graphite possesses an exceptionally high thermal capacity when compared to molybdenum and tungsten, other materials used for making the substrate of the disc. At 1000° C., the ratio of thermal capacity, in relative units, and in the order mentioned heretofore, is 48:7.4 and 48:4.1. The ratio of emissivity at 1000° C. is 0.85:0.15 in both instances. However, the difficulty in using graphite as a substrate material is the problem of how to join the anode target to the graphite substrate.

Prior art anode assemblies embodying a graphite substrate suggest the use of zirconium or hafnium as a suitable material for joining the anode target to the graphite substrate. However, both of these materials are carbide formers and present the problem of how to minimize the amount of carbide formed during the joining operation, as well as during the desired working lifetime of the anode assembly, usually 10,000 x-ray exposures, minimum. The working lifetime subjects the anode assembly temperature to being cycled to reasonably high levels, the order of 1200° C., and, therefore, continued carbide formation is a distinct possibility. The mechanical properties of a carbide layer formed in such an anode assembly may preclude the use of such an anode assembly in rotating x-ray anode tubes subjected to large amplitude thermal cycling.

Rhenium has been employed as a material for joining the anode target to the graphite substrate. Rhenium does not form a carbide at the temperature of joining or at the operating temperature of the tube assembly. However, the solubility of carbon in rhenium is relatively high and permits, the diffusion of carbon therethrough and into the material comprising the anode target. Consequently, the material of the anode target may be embrittled by the formation of tungsten carbide. As a result, the operation lifetime and efficiency of such anode assembly designs are the same as, or less than, that of currently employed all-metallic anode assemblies.

It is therefore an object of this invention to provide a new and improved method for joining an anode target to a graphite substrate.

Another object of this invention is to provide a new and improved method for joining an anode target comprising tungsten or a tungsten-rhenium alloy to a graphite substrate by employing suitable braze materials such as platinum and specific platinum-chromium alloys.

Other objects of this invention will, in part, be obvious and will, in part, appear hereinafter.

SUMMARY OF THE INVENTION

In accordance with the teachings of this invention there is provided a method for joining an anode target comprising tungsten or a tungsten alloy to a graphite substrate to make a disc assembly for a rotating x-ray anode tube. The brazed meterial may be platinum, a platinum-chromium alloy, palladium, osmium, rhodium or ruthenium. The brazing operation is preferably carried out in a controlled atmosphere comprising hydrogen gas.

DESCRIPTION OF THE INVENTION

Figure 1:
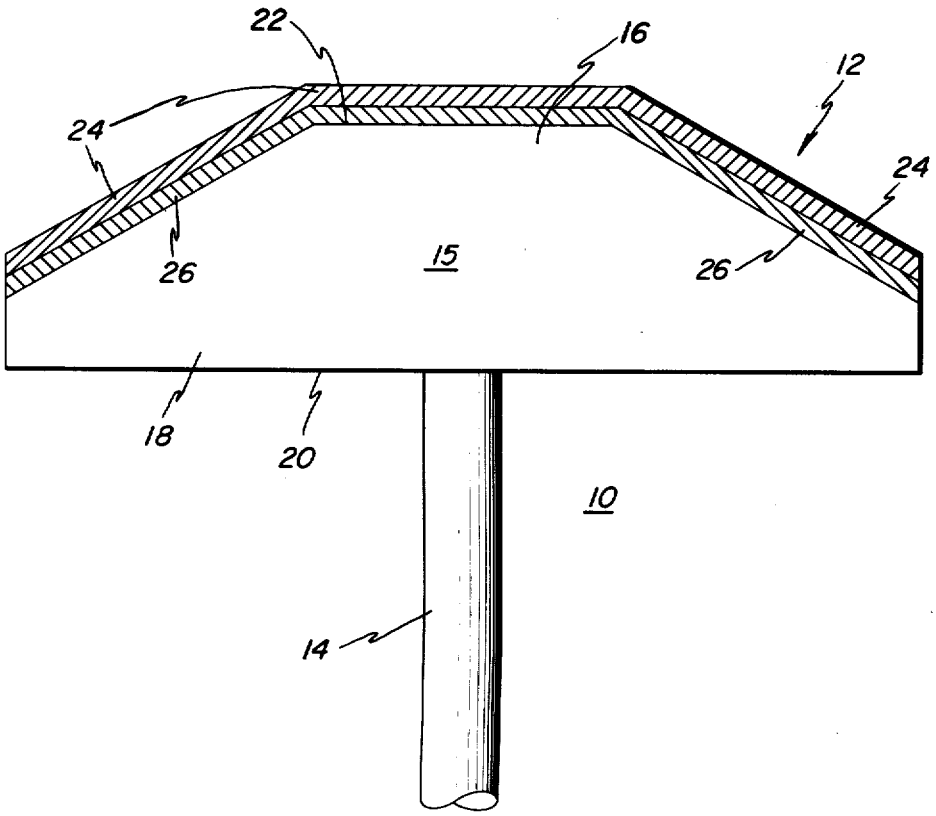
FIG. 1 is an elevation view, in cross-section, of a disc assembly.
Figure 2:
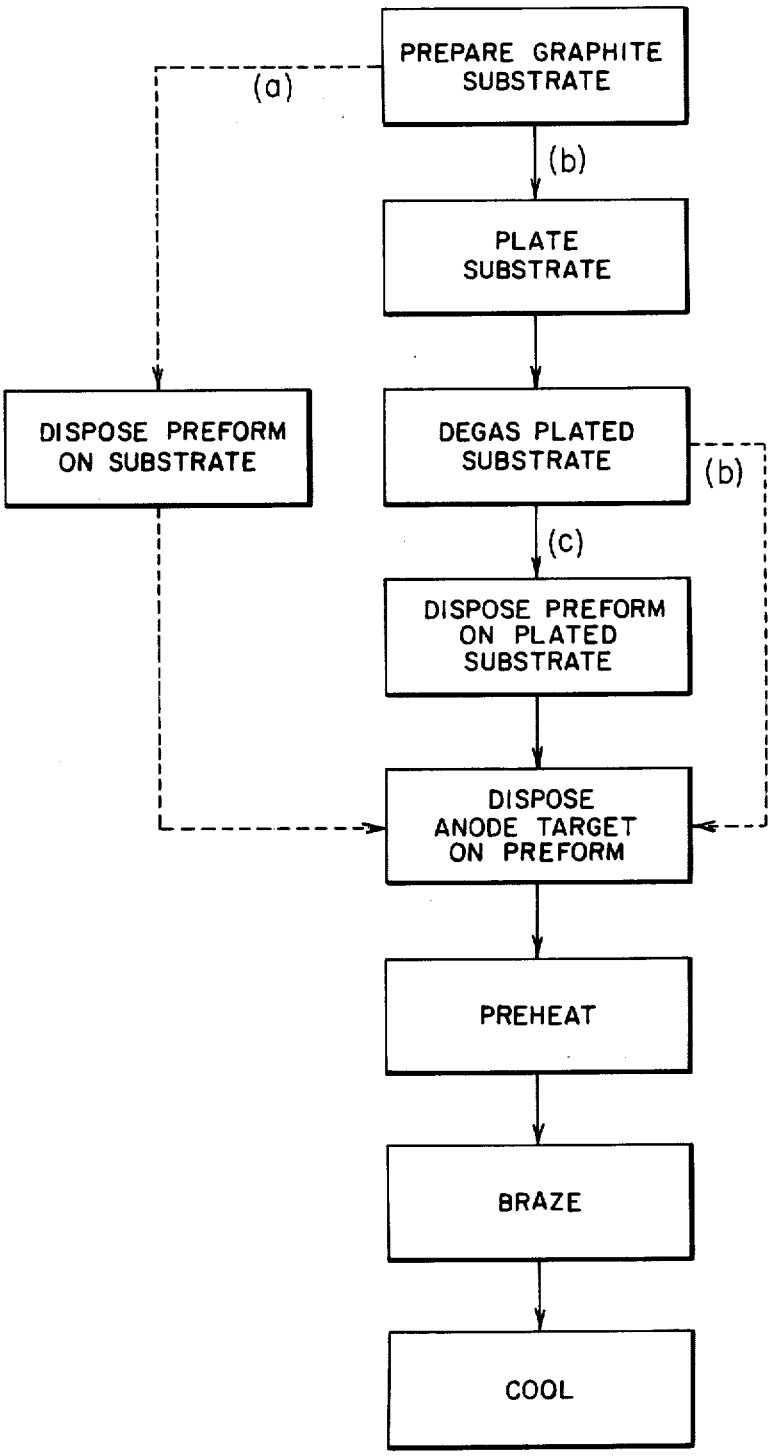
FIG. 2 is a flow diagram of several methods of joining an anode target to a substrate.

Referring now to FIG. 1, there is shown an anode assembly 10 suitable for use in a rotating x-ray anode tube. The anode assembly 10 includes a disc 12 joined to a stem 14 by suitable means such, for example, as by brazing, welding and the like. The disc 12 comprises a graphite substrate 15 which includes a central portion 16 and an integral outer portion 18. The substrate 15 has two opposed major surfaces 20 and 22 which comprise, respectively, the inner and outer surfaces of the substrate. An anode target 24 is affixed to a selected surface area of the outer surface 22 of the integral outer portion 18 of the substrate 15 by a layer 26 of metal.

The material of the anode target 24 is either tungsten or an alloy of tungsten and rhenium. The rhenium content may vary up to about 25 weight percent but is typically from 3 to 10 weight percent.

The material of the metal layer 26 is one that is not a carbide former. Further, there should be no solubility of carbon in the material of the metal layer 26 in the range of operating tempertures which is of the order of from about 1000° C. to about 1300° C. Partial solubility of carbon in the material of the metal layer 26 is permissible at much higher temperatures, that is to say, at the temperature of joining the target 24 to the substrate 15, a solubility of carbon of from 1 to 4 atomic percent in the material of the metal layer 26 is desirable. The material should have some solubility in tungsten and the tungsten alloy of the target 24. *Although the brazed regions that develop above and below layer 26 are not shown in FIG. 1, the above solubility criteria assure that, under the proper processing conditions, the metal provided to yield layer 26 as the barrier to carbon diffusion will melt and alloy with (i.e. be brazed to) the metal of layer 24 over the surface thereof contacting layer 24 and will melt and alloy with (i.e. be brazed to) carbon over the surface of graphite substrate 15 wet thereby.*

Suitable materials for comprising the metal layer 26 are platinum, palladium, rhodium, osmium and ruthenium. All of these material are non-carbide formers. In addition each of the materials is soluble in tungsten and the tungsten alloy of the target 24 and has a low solubility for carbon. In particular, the solubility for carbon is practically zero at the maximum bulk operating temperature (about 1300° C.) of a rotating x-ray anode tube embodying the anode assembly 10. Platinum, palladium, rhodium, osmium and ruthenium all form a simple eutectic system with carbon. For commercial applications, however, platinum and palladium are the only practical materials to be used in the metal layer 26. Rhodium, osmium, and ruthenium, although they each have a higher brazing temperature than platinum and palladium, are too expensive at this time so as to be employed as the principle material in the metal layer 26.

Palladium is suitable for the material of the metal layer 26 as it has a minimum joining or carbon-palladium eutectic temperature of 1504° C., and nearly zero solubility for carbon at temperature less than 1300° C. Excellent bonds are achieved between the anode target 24 and the substrate 15. However, the maximum bulk operating temperature of the anode assembly 10 is about 1300° C., allowing only a 200° C. margin of safety. Therefore, the reliability of the anode assembly 10 is less than that when platinum comprises the material of the metal layer 26.

The preferred material at this time for comprising the material of the metal layer 26 is platinum. The temperature of joining the anode target 24 to the graphite substrate 15 is about 1800° C. The minimum joining temperature, or carbon-platinum eutectic temperature is 1705° C. This provides a greater safety margin for the anode tube operation, that is 400° C. Below about 1500° C., the platinum metal layer 26 has a zero solubility for carbon. Therefore, the platinum metal layer 26 provides an excellent barrier against carbon diffusion into the anode target 24 at the operating temperature range of about 1000° to about 1300° C.

Alloys of platinum may also be used. However, one must not employ large concentrations of elements therein which when alloyed may cause carbide formation at the joining temperature or excessive carbon diffusion in the tube operating temperature range. Although chromium is a carbide former, platinum with up to 1% by weight chromium can be employed as the metal layer 26.

Several methods may be employed to provide the platinum or platinum alloy metal layer 26. One may plate the graphite. Preferably an electroplating process is employed. A thickness of from ¼ mil to about 1 mil is preferred. Alternately, the platinum may be sputtered onto the graphite. The platinum deposition is followed by heat treating the plated graphite at about 1200°±20° C. for a period of about 3 hours in vacuum to degas the plated graphite.

The metal layer 26 may also be provided by employing platinum or a platinum-chromium alloy in a foil form. The thickness of the foil depends solely on the need to assure one of a good bond or joint. The foil has a thickness of at least ½ mil. Should the foil thickness be less than ½ mil, an incomplete bond may result because of the lack of intimate contact between the anode target 24 and the graphite substrate 15 due to the irregularities on each surface. Preferably the foil has a thickness of 1 mil in order to assure one of having a reliable joint formed by the the metal layer 26.

The anode assembly 10 may be fabricated in several ways. In one instance the anode target 24 is disposed on the plated graphite substrate 15 and joined together at an elevated temperature of about 1800° C. In a second instance, a sandwich of a graphite substrate 15, a foil of platinum or a platinum-chromium alloy and the anode target 24 is assembled and joined together at about 1800° C.

A preferred method of joining the tungsten or tungsten-rhenium alloy target anode 24 to the graphite substrate 15 includes the assembly, in a sandwich configuration, of a platinum plated graphite substrate 15, a foil member and the target anode 24. The foil member is disposed on the plated surface of the graphite substrate 15. The anode target is then disposed on the foil member. The components of the "sandwich" are held together in a suitable manner so that the surfaces to be joined together are in a close abutting contact relationship with each other.

The assembled components are placed in a controlled atmosphere furnace. The preferred atmosphere is hydrogen. The hydrogen aids the platinum wetting of the surfaces to be joined together. In addition, the hydrogen atmosphere acts as a reducing agent for any oxide present on the surface of the components to be joined together.

The assembled components are initially placed in the coolest portion of a hydrogen tube furnace and preheated for a period of time up to about 30 minutes to acclimatize the component. A minimum of 10 minutes is desired. Upon completion of preheating, the assembled components are moved into a portion of the furnace where the temperature is about 1800° C.±30° C. The assembled components are retained in this portion of the furnace for a period of time sufficient to join the components together by brazing by formation of the layer of metal 26. A period of time up to 10 minutes has found to be sufficient, with about 3 minutes being preferred. Upon completion of the brazing step, the assembly, now the disc 12, is moved to a "cool down zone" in the tube furnace where it remains for a sufficient time to cool the components and solidify the melt to form the metal layer 26. A time of approximately 1 hour has been found sufficient to cool the disc sufficiently from a temperature of about 1000° C. in the "cool down zone" for removal from the furnace.

A layer of platinum, 1 mil in thickness, was disposed on a surface of a block of graphite, 1 inch in thickness, by electrodeposition means. The plated substrate was degassed at 1200° C.±20° C. for a period of 3 hours. A tungsten anode target was prepared and one surface metallographically polished to 600 grit paper. A preform, 1 mil in thickness, was prepared from a foil sheet of platinum.

A sandwich was then assembled. The platinum preform was disposed on the platinum plated surface of the graphite substrate. The anode target was placed on the preform with the polished surface in an abutting contact relationship with the preform. The assembled components were bound tightly together, disposed in a molybdenum boat and placed in the coolest end of a hydrogen tube furnace. The assembled components were allowed to acclimatize for 10 minutes then moved into the hottest portion of the tube furnace. The temperature was measured by an optical pyrometer and found to be 1800° C.±30° C. The assembled components remained in the hot zone for 3 minutes to braze the components together. The assembled components were then moved to a cooler zone in the furnace, 1000° C.±20° C. and allowed to furnace cool from that temperature for 45 minutes before removing them from the furnace.

Upon removal from the furnace the brazed components were [examine] *examined* visually. The braze joint appeared sound. The brazed assembly of components was then sectioned and the tungsten-platinum-carbon interface examined. The braze joint was sound throughout. Various sections were then subjected to bending loads until fracture occurred. All fractures occurred either in the tungsten anode target or in the graphite substrate but never in the platinum-tungsten or the platinum-graphite interfaces.

The new disc assembly enables one to employ radiographic techniques which require higher power outputs for either short or long durations without the fear of premature failure during use than what could be employed by the prior art disc assemblies. The capability of being able to withstand higher power outputs enables one to expose patients for a shorter time during x-raying procedures.

I claim as my invention:

1. A method for joining an anode target to a graphite substrate of a disc for use in a rotating x-ray anode tube comprising the process steps of a. preparing a graphite substrate for assembling an anode target to a preselected surface area thereof;

b. disposing a layer of a metal [of a predetermined thickness] on [the] *said* preselected surface area of [the] *said* substrate, [the] *said* layer of metal having a [predetermined] thickness *of at least ¼ mil* and [comprising a] *consisting of at least one* metal selected from the group consisting of [rhodium, osmium, ruthenium,] platinum[, palladium] and an alloy of platinum and [chronmium] *chromium*, wherein chromium is present in amounts up to about 1 percent by weight;

c. disposing [an] anode target *material* on [the] *said* layer of metal, [the] *said* anode target *material* comprising a metal selected from the group consisting of tungsten and a tungsten-rhenium alloy wherein rhenium is present in amounts up to about 25 percent by weight;

d. preheating [the] *said* substrate, layer of metal and anode target *material* in a [controlled] *hydrogen* atmosphere at a first elevated temperature of from about 600° to about 900° C. for a predetermined period of time;

e. heating [the] *said* substrate, [the] *said layer of* metal [layer] and [the] *said* anode target *material* to a second elevated temperature of from about 1770° to 1830° C. for a predetermined period of time up to 5 minutes in a [controlled] *hydrogen* atmosphere to braze the anode target *material* to [the] *said* preselected surface area of [the] *said* substrate, and f. cooling [the] *said* substrate, *layer of* metal [layer] and *resulting* anode target in a [controlled] *hydrogen* atmosphere to a low enough temperature to permit exposure to the atmosphere.

2. The method of claim 1 wherein the thickness of the metal layer is at least 0.5 mil.

3. The method of claim 2 wherein the thickness of the metal layer is no greater than about 1 mil.

4. The method of claim 3 wherein the metal of the metal layer is platinum.

[5. The method of claim 4 wherein the controlled atmosphere is hydrogen gas.]

6. The method of claim 3 wherein the metal of the *layer of* metal [layer] is an alloy of platinum and chromium.

[7. The method of claim 6 wherein the controlled atmosphere is hydrogen gas.]

8. The method of claim 1 wherein the layer of metal is plated onto the preselected surface area of the graphite substrate by electrodeposition means, and including practicing the additional process step prior to disposing the anode target *material* thereon of degassing [the] *said* plated substrate at a predetermined elevated temperature for a predetermined period of time.

9. The method of claim 8 wherein the plated layer is at least 0.5 mil in thickness.

10. The method of claim 9 wherein the metal of the plated layer is platinum.

[11. The method of claim 10 wherein the controlled atmosphere is hydrogen gas.]

12. The method of claim 8 wherein a second layer of metal is disposed on the plated surface of the substrate and the anode target *material* is disposed on [the] *said* second layer, the metal of [the] *said* second layer is one selected from the group consisting of [rhodium, osmium, ruthenium,] platinum[,] *and* an alloy of platinum and chromium, wherein chromium is present in amounts up to about 1 percent by weight[, and palladium].

13. The method of claim 12 wherein the plated layer of metal and the second metal layer are each at least 0.5 mil in thickness.

14. The method of claim 13 wherein the metal of the plated layer is platinum, and the metal of the second metal layer is platinum.

[15. The method of claim 14 wherein the controlled atmosphere is hydrogen gas.]

16. The method of claim 14 wherein the thickness of the second metal layer is about 1 mil.

[17. The method of claim 16 wherein the controlled atmosphere is hydrogen gas.]

18. The method of claim 13 wherein the metal of the plated layer is platinum, and the metal of the second layer is an alloy of platinum and chromium wherein chromium is present in amounts up to about 1 percent by weight.

[19. The method of claim 18 wherein the controlled atmosphere is hydrogen gas.]

20. The method of claim 18 wherein the thickness of the second metal layer is about 1 mil.

[21. The method of claim 20 wherein the controlled atmosphere is hydrogen gas.]

* * * * *